United States Patent
Nemit, Jr. et al.

(10) Patent No.: US 9,976,562 B2
(45) Date of Patent: May 22, 2018

(54) SEMI-HERMETIC COMPRESSOR MOTOR FOR AMMONIA SERVICE

(71) Applicant: JOHNSON CONTROLS TECHNOLOGY COMPANY, Holland, MI (US)

(72) Inventors: Paul Nemit, Jr., Waynesboro, PA (US); Dennis Andrew Harrington, Mount Airy, MD (US); Paul A. Huber, Marion, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 238 days.

(21) Appl. No.: 14/437,676

(22) PCT Filed: Oct. 23, 2013

(86) PCT No.: PCT/US2013/066282
§ 371 (c)(1),
(2) Date: Apr. 22, 2015

(87) PCT Pub. No.: WO2014/070538
PCT Pub. Date: May 8, 2014

(65) Prior Publication Data
US 2015/0292513 A1 Oct. 15, 2015

Related U.S. Application Data

(60) Provisional application No. 61/722,400, filed on Nov. 5, 2012.

(51) Int. Cl.
*F04B 39/02* (2006.01)
*F04D 25/06* (2006.01)
(Continued)

(52) U.S. Cl.
CPC .......... *F04D 25/0606* (2013.01); *F04B 35/04* (2013.01); *F04B 39/06* (2013.01);
(Continued)

(58) Field of Classification Search
CPC .. F04B 39/023; F04B 39/0276; H02G 3/0658
See application file for complete search history.

(56) References Cited

U.S. PATENT DOCUMENTS 3,055,972 A * 9/1962 Peterson .............. H02G 3/0658
174/151
4,544,800 A * 10/1985 Katsuura .............. H02G 3/0658
174/653
(Continued)

FOREIGN PATENT DOCUMENTS

DE 1750095 A1 3/1971
EP 0121747 A2 10/1984
(Continued)

OTHER PUBLICATIONS

European Patent Office, Examination Report issued in corresponding European Patent Application No. 13785942; dated Jan. 17, 2017; 5 pages.
(Continued)

*Primary Examiner* — Patrick Hamo
(74) *Attorney, Agent, or Firm* — Fletcher Yoder, P.C.

(57) ABSTRACT

A semi-hermetic compressor for ammonia service includes a compressor portion and a motor encased in an airtight housing portion. The compressor portion compresses ammonia. The motor includes a stator winding. Motor leads are connected to the field windings, and extend from the housing portion through a pass-through assembly. The pass-through assembly includes a base portion, a first isolation portion, a second isolation portion, a sealant and a cap portion. The base portion is inserted into the housing portion with an
(Continued)

airtight seal. The first isolation portion is arranged to fit within an annular opening in the base portion. First and second isolation portions include apertures for a motor lead. Sealant is disposed between the isolation portions. A cap portion attaches to the base portion. An anti-rotation element prevents relative rotation there between.

37 Claims, 3 Drawing Sheets

(51) Int. Cl.

| | | |
|---|---|---|
| *F04B 35/04* | (2006.01) | |
| *F04C 23/00* | (2006.01) | |
| *F04B 39/06* | (2006.01) | |
| *F04B 39/12* | (2006.01) | |
| *H02G 15/013* | (2006.01) | |
| *H02G 15/04* | (2006.01) | |
| *F04C 29/00* | (2006.01) | |
| *F04D 29/40* | (2006.01) | |
| *F04C 18/16* | (2006.01) | |

(52) U.S. Cl.
CPC .......... *F04B 39/121* (2013.01); *F04C 23/008* (2013.01); *F04C 29/0085* (2013.01); *F04D 29/40* (2013.01); *H02G 15/013* (2013.01); *H02G 15/04* (2013.01); *F04C 18/16* (2013.01); *F04C 2210/265* (2013.01); *F04C 2240/803* (2013.01)

(56) References Cited

U.S. PATENT DOCUMENTS

| | | | |
|---|---|---|---|
| 5,688,433 A | | 11/1997 | Kasahara et al. |
| 7,288,719 B2 | | 10/2007 | Barnhard et al. |
| 8,388,318 B2 * | | 3/2013 | Tolbert, Jr. ............ F04B 39/023 417/313 |
| 2008/0012438 A1 * | | 1/2008 | Hong ...................... F04B 17/03 310/71 |
| 2010/0254834 A1 * | | 10/2010 | Tolbert, Jr. ............ F04B 39/023 417/410.1 |
| 2016/0248287 A1 | | 8/2016 | Sandkötter |

FOREIGN PATENT DOCUMENTS

| | | |
|---|---|---|
| EP | 1291528 A2 | 3/2003 |
| GB | 1468808 | 3/1977 |
| JP | H05252680 | 9/1993 |
| JP | 2003074484 A | 3/2003 |
| JP | 2005171943 A | 6/2005 |

OTHER PUBLICATIONS

International Searching Authority, International Search Report and Written Opinion issued in PCT/US2013/066282, dated Jan. 14, 2014; 11 pages.

* cited by examiner

SEMI-HERMETIC COMPRESSOR MOTOR FOR AMMONIA SERVICE

CROSS-REFERENCES TO RELATED APPLICATIONS

This patent application claims the benefit of and priority from U.S. Provisional Patent Application No. 61/722,400 filed Nov. 5, 2012, entitled SEMI HERMETIC COMPRESSOR MOTOR FOR AMMONIA SERVICE, which is hereby incorporated by reference.

BACKGROUND

The application generally relates to a semi-hermetic compressor motor for use with ammonia refrigerant. The application relates more specifically to a semi-hermetic compressor motor having copper field windings, for use with ammonia refrigerant.

Ammonia is a common, naturally occurring compound in the environment that breaks down naturally into hydrogen and nitrogen. Ammonia refrigeration is a cost effective and energy efficient method of processing and storing frozen and unfrozen foods. Ammonia refrigeration is also used in the chemical industry. Air conditioning has been provided by ammonia refrigeration systems in office buildings, parks, and small buildings such as convenience stores.

Ammonia is electrically conductive under some conditions, and corrosive to many materials, e.g., copper wire used in high efficiency electric motors. Electrical connections, e.g., motor terminations of multiple conductors, which are exposed to ammonia in the environment, can present a risk of short circuit or other failure. Electrical conductors must be electrically insulated and sealed from ammonia vapor or liquid.

Semi-hermetic motors are not widely used in refrigeration or HVAC applications where ammonia is the refrigerant because the winding insulation and the ammonia refrigerant are incompatible. In the past it was believed that copper and other yellow metals used in manufacturing motor windings could not be used in an ammonia refrigerant system because such metals would be corroded by the refrigerant in the presence of water.

Aluminum wire has been used in some motors employed to reduce problems associated with potential exposure to ammonia. Aluminum wire is used, for example, in shipboard applications, as aluminum is more corrosion resistant in the presence of ammonia and water. Aluminum wire results in reduced motor efficiency due to the higher resistance of aluminum wire than that of copper wire. Because of the electrical conductivity of ammonia, there can be no exposure of metal conductors to the gas stream. To avoid electrical faults, in some instances the motor stator may be encased with a sealed enclosure, or the motor windings encapsulated. These isolation measures reduce the benefit of a semi-hermetic motor as the heat dissipation capacity of the windings is reduced, and external cooling may be required, or the size of the motor increased. Either method results in reduced heat dissipation and correspondingly higher motor winding temperatures. Current semi-hermetic motors using aluminum windings experience a loss in efficiency of about 4% to 5%.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

A semi-hermetic compressor is applied to a refrigeration system with ammonia as the working fluid. The motor is exposed to ammonia refrigerant within a semi-hermetic housing, and is cooled by the ammonia refrigerant moving through the compressor. Ammonia may be used in refrigeration and air-conditioning systems because it is an environmentally compatible, natural refrigerant. Ammonia has a very good cycle efficiency and low power-to-cooling ratio. Using a semi-hermetic motor for this purpose has the benefit of economy, throughput, and the elimination of a shaft seal which is a potential leakage source to the atmosphere. The semi-hermetic motor may be operated at greater speeds than a conventional air cooled motor because the motor rotor can be installed over-hung on the existing compressor bearings. Since these bearings are normally oil mist lubricated instead of grease lubricated as would normally be the case in a separate air cooled motor, they can operate to much higher speeds, thereby reducing the size and cost required for the compressor and motor. The compressor therefore may have a more compact packaging arrangement than open drive motors and compressors, which requires more space and cost. So the semi-hermetic motor reduces the size, weight, and cost of the compressor and motor. The semi-hermetic motor is suitable for variable frequency drive (VFD) operation as a result of the increased operating speeds and reduced costs associated with semi-hermetic motors.

According to a first aspect, a semi-hermetic compressor is disclosed which includes a compressor portion and a motor encased in a housing portion. The compressor portion compresses a working fluid, e.g., ammonia, and is driven by the motor.

According to a first embodiment the motor includes a plurality of field windings. Motor leads are connected to the motor field windings. The motor leads extend from an interior of the housing portion through an annular pass-through assembly mounted in the housing portion. The pass-through assembly comprising a base portion, a first isolation portion, a second isolation portion, and a cap portion. The base portion forms an airtight seal between the housing portion and an external periphery of the base portion. Each of the first and second isolation portions includes at least one aperture for receiving and compressing an insulated motor lead passing through the base portion.

A second aspect relates to a pass-through assembly for passing electrical leads through a semi-hermetic compressor housing includes a base portion, a first isolation portion, a second isolation portion, and a cap portion.

According to an embodiment of the pass-through assembly the base portion forms an airtight seal between the housing portion and an external periphery of the base portion. Each of the first and second isolation portions includes at least one aperture for receiving and compressing an insulated motor lead passing through the base portion.

Another disclosed embodiment comprises a semi-hermetic screw compressor for use in ammonia compression with copper field wiring used in the motor. The motor requires an insulation system that will maintain an ammonia tight seal around the copper wires.

Another embodiment discloses wiring from the motor to the outside electrical connection must be through a pass-through assembly that will maintain the complete electrical isolation of the copper field wiring to the system and the atmosphere.

Certain advantages of the embodiments described herein include the use of copper windings in the semi-hermetic motor with ammonia environment to increase the motor efficiency.

Another advantage is that the semi-hermetic motor with copper windings may be used for various HVAC or refrigeration applications, including ammonia-charged chillers.

Alternative exemplary embodiments relate to other features and combinations of features as may be generally recited in the claims.

DETAILED DESCRIPTION OF THE EXEMPLARY EMBODIMENTS

Figure 1:
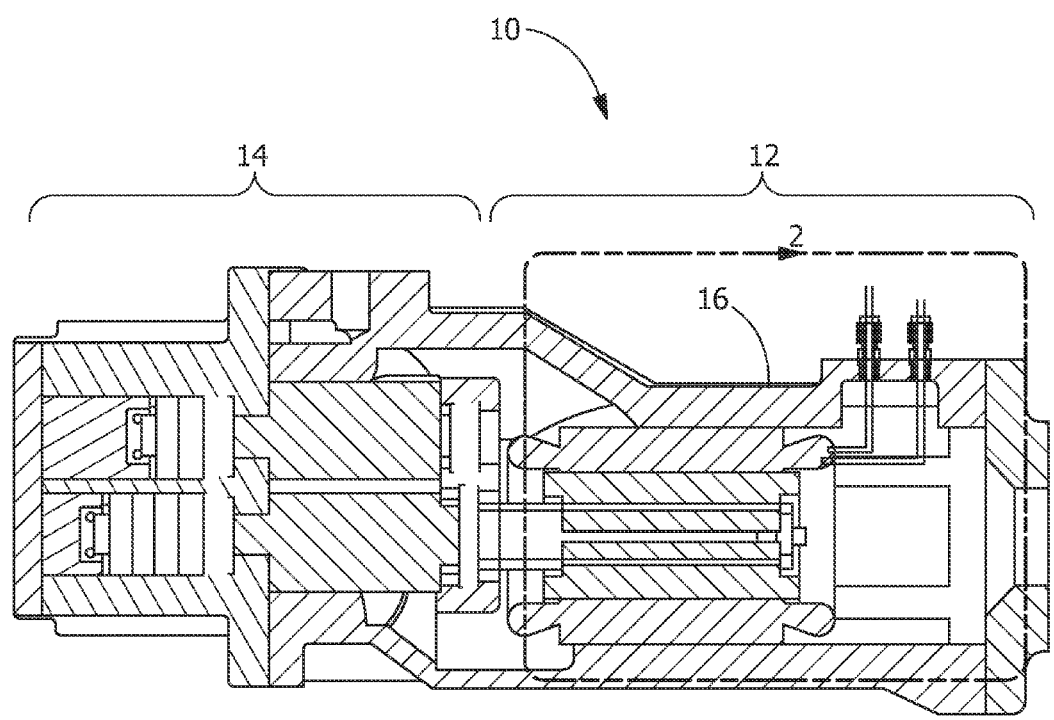
FIG. 1 shows an exemplary semi-hermetic compressor cross-sectional view having a sealed motor connector.
Figure 2:
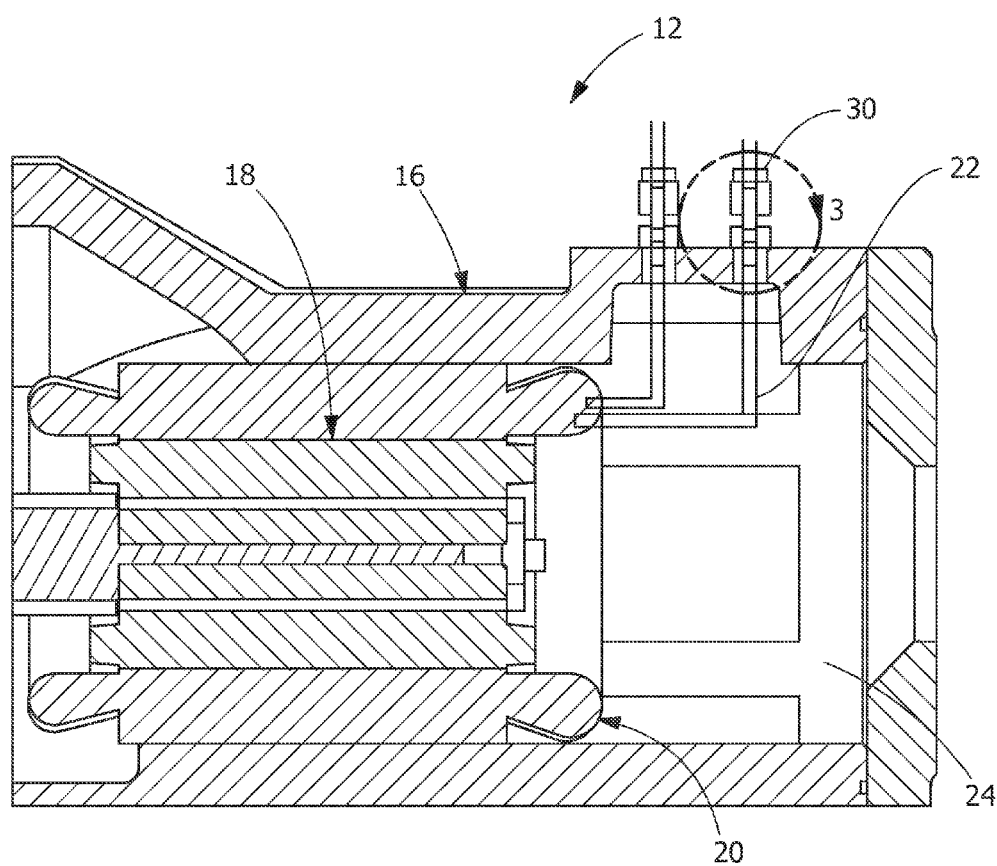
FIG. 2 shows an enlarged cross-sectional partial detail of the semi-hermetic compressor indicated by section B in FIG. 1.

Referring first to FIGS. 1 and 2, a semi-hermetic compressor 10 includes a motor 12 and a compressor portion 14. A semi-hermetic housing 16 encases both compressor portion 14 and motor 12. Motor 12 includes a stator 20 arranged about a magnetic core or rotor 18. Rotor 18 is made of steel laminations that generate magnetic fields when motor 12 is energized. When three phase AC power is applied, the magnetic field advances from one stator winding to the next, causing the magnetic field to rotate and drive rotor 18. An electrical pass-through assembly 30 is provided at one end of semi-hermetic compressor 10 adjacent motor 12. Pass-through assembly 30 provides a sealed conduit for field coil wires 22 to pass through housing 16 to the external atmosphere, where the individual field coil wires can be crimped or otherwise joined to form various wye, delta or wye-delta winding configurations. The external connections are able to be made in a non-corrosive or less corrosive atmosphere than the ammonia refrigerant 24 contained within housing 16.

Figure 3:
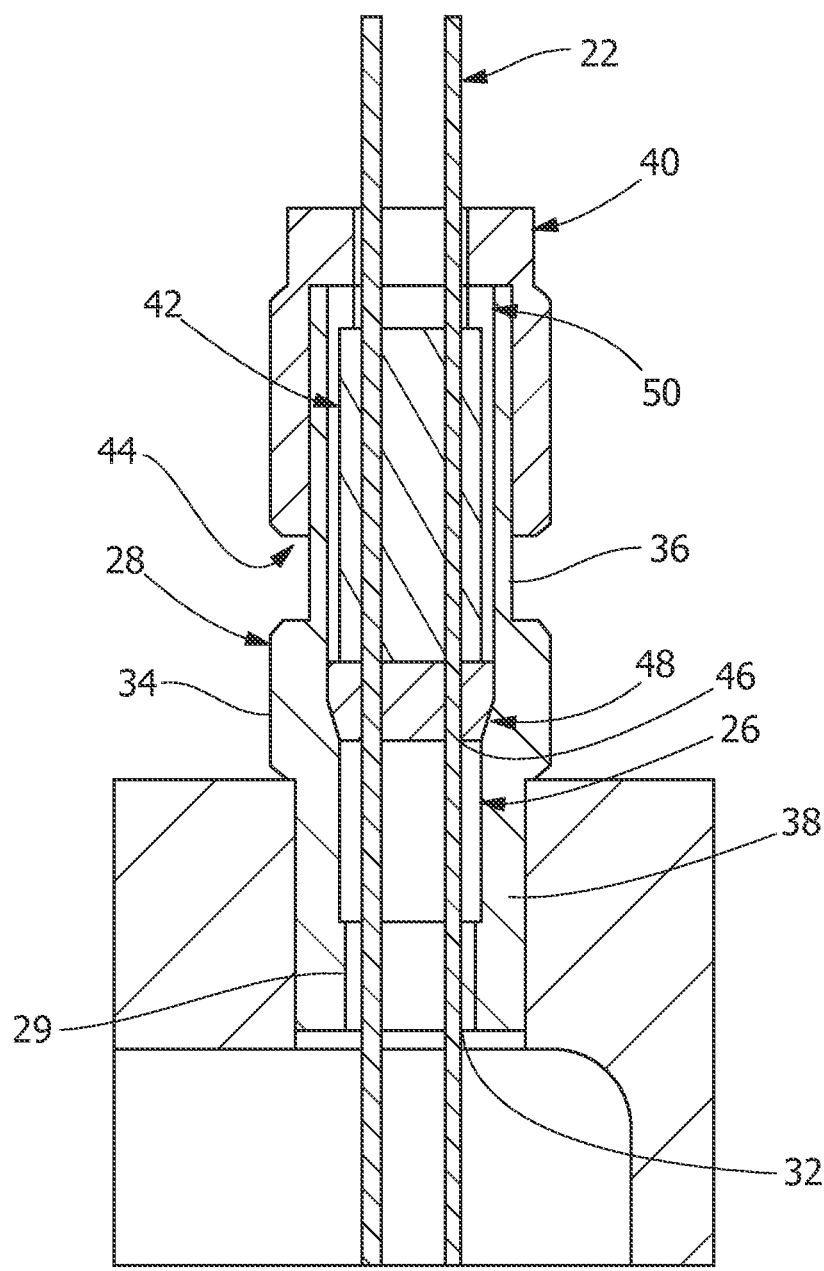
FIG. 3 shows an enlarged cross-sectional partial view of electrical penetration seal indicated by section C in FIG. 2.

Referring next to FIG. 3, an exemplary pass-through assembly 30 is shown. In one embodiment, pass-through assembly 30 may be a compression-type fitting that seals air passages around the outside of the wire and also compresses the wire insulation around the individual wires to prevent refrigerant leakage along the path of the wire where it passes through assembly 30 to the external atmosphere. Field coil wires 22 extend from stator 20 through pass-through assembly 30, first into a cylindrical first isolator portion 26 disposed within an annular base 28. First isolator portion 26 provides an airtight seal between an outer surface of isolator portion 26 and an inner annulus 29 of base 28. First isolator portion 26 includes apertures 32 for receiving field coil wires 22 there through. Base 28 is removably secured to housing 16 by an airtight connection, e.g., by screw thread attachment, quick-disconnect fitting or similar attachment that are well known in the art. Base 28 may include a hexagonal or rectangular middle segment 34, internal connector portion 38 and external connector portion 36. Middle segment 34 provides a surface for applying a tool for connecting or removing base 28. Internal connector portion 38 extends into housing 12 and external connector portion 36 extends from middle segment 34 to receive a cap portion 40. Cap portion 40 attaches to external connection portion 36, e.g., by screw thread attachment, quick-disconnect or similar attachment means. A second isolator portion 42 fits snugly within the annular opening 44 through second isolator portion 42 to provide an airtight seal there between. Second isolator portion 42 includes a plurality of apertures 46 corresponding with the apertures 32 in first isolator portion 26.

In one embodiment, a sealant 48, e.g., epoxy, silicone, putty, or other suitable material may be applied in the space between isolators 42, 26 to seal any gaps that may be present around the field coil wires 22 or inner annulus 29. Further, an anti-rotation element 50 may be provided adjacent cap portion 40 to prevent rotation of cap portion 40 relative to base 28.

A conventional three phase motor may have multiple individual field winding leads (not shown) that are crimped together to form motor lead 22 that extends from motor 12. External power connections are made to motor lead 22, e.g., in a junction box or other connection enclosure outside of housing 16. In the case of a three phase motor at least three motor leads 22 are present, depending upon the configuration of the motor windings. Wye connection, delta connection, or wye/delta connection are examples of various stator winding configurations. Electrical connections inside motor 12 to the external power source results in at least a portion of motor leads 22 being potentially exposed to a working fluid, e.g., ammonia refrigerant. All power connections may be made outside of the pressure boundary defined by housing 16 to prevent exposure of the wire to the refrigerant.

Working fluids or refrigerants that have low electrical conductivity do not present a problem with electrical short circuits through exposure to motor leads 22 or other electrical conductors. However, ammonia is characterized by a higher electrical conductivity than other working fluids and refrigerants, such that when ammonia is used for the working fluid, exposed motor leads or connections will result in a short circuit to ground.

The wire insulation used for stator 20 and motor leads 22 must be suitable for use with ammonia liquid, ammonia gas, and lubricant used in the refrigeration system. This effectively isolates the individual field coil wires and allows the motor to function in the ammonia environment, but also give the added benefit of using yellow metals, e.g., copper, in the motor windings. The motor would then have the same efficiency as is seen in use with other more common HCFC, HFC or HFO refrigerants.

Copper motor windings and wire may be used with the pass through connector described above, provided the electrical insulation is adequate to prevent exposure of the motor wire to ammonia and the motor wires can be secured to prevent infiltration of the wire itself from expose to the ammonia. If the insulation is permeable and a small amount of ammonia finds its way to the surface of the wire, the wire itself will not disintegrate. The copper wire may start to corrode, but the corrosion does not inhibit the current carrying capacity of the motor conductors or windings. If corrosion occurs, there is only a light patina of corrosion buildup, and as such no degradation of the wire, or the conductive quality of the wire or its magnetic properties. If water is allowed to mix with the ammonia, even in relatively small percentages, the mixture will corrode the copper wire quickly. So it is important that the insulation system protect the wire from exposure to any water and ammonia mixture circulating in the system. Filter dryers may be used in the ammonia system to capture and contain any water that is mixed with the ammonia during normal charging with refrigerant and servicing. This will reduce any potential for corrosion of the copper wire. However, once the insulation system is breached the electrical conductivity of wet ammonia may generally cause safeties in the motor control to prevent operation due to shorting of the electrical input to the motor.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the semi-hermetic ammonia compressor with sealed pass through connector as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A semi-hermetic compressor comprising a compressor portion and a motor encased in a housing portion; the compressor portion configured to compress a working fluid, the working fluid comprising of ammonia, and being driven by the motor; the motor comprising a plurality of field windings, the plurality of field windings being insulated copper wires; the plurality of insulated copper wires forming the stator of the motor, the insulated copper wires extending from the stator within an interior of the housing portion to an exterior of the housing portion through an annular pass-through assembly mounted in the housing portion; and the pass-through assembly comprising a base portion, a first isolation portion, a second isolation portion, and a cap portion; wherein the base portion forms an airtight seal between the housing portion and an external periphery of the base portion; each of the first and second isolation portions comprising at least one aperture for receiving and compressing the insulated copper wires passing through the base portion.

2. The compressor of claim 1, wherein: the first isolation portion is configured to fit within an annular opening in the base portion; or wherein the cap portion is removably attachable to the base portion; or wherein the pass-through assembly is a compression-type fitting configured to seal around an outer surface of the insulated copper wire and to compress a wire insulation around an individual wire of the insulated copper wire to prevent refrigerant leakage along the insulated copper wire where the insulated copper wire passes through the pass-through assembly to an external atmosphere.

3. The compressor of claim 1, further comprising an anti-rotation element disposed between the cap portion and the base portion to prevent relative rotation between the cap portion and the base portion; or a sealant disposed between the first and second isolation portion within the base portion.

4. The compressor of claim 1, wherein the insulated copper wires that extend from the stator of the motor through the pass-through assembly further extend into the first isolation portion disposed within the base portion.

5. The compressor of claim 1, wherein the base portion is removably securable to the housing portion by a threaded attachment or a quick-disconnect fitting.

6. The compressor of claim 5, wherein the base portion further comprises a middle segment, an internal connector portion, and an external connector portion, and wherein the middle segment comprises a hexagonal or rectangular configuration with at least one surface for applying a tool for connecting or removing the base portion; and wherein the internal connector portion extends into the housing portion and the external connector portion extends from the middle segment and receives a cap portion.

7. The compressor of claim 6, wherein the cap portion is configured to mate with the external connector portion by a threaded attachment or a quick-disconnect fitting.

8. The compressor of claim 1, wherein the second isolation portion fits within an annular opening through the second isolation portion to form an airtight seal.

9. The compressor of claim 1, wherein the at least one aperture in the first isolation portion comprises a plurality of apertures, and wherein the at least one aperture in the second isolation portion comprises a plurality of apertures corresponding with the plurality of apertures in the first isolation portion, and wherein an individual insulated copper wire of the insulted copper wires passes through corresponding apertures of the plurality of apertures in the first isolation portions and the plurality of apertures in the second isolation portion.

10. The compressor of claim 6, further comprising an anti-rotation element adjacent to the cap portion, the anti-rotation element configured to prevent rotation of the cap portion relative to the base portion.

11. The compressor of claim 1, wherein the ammonia moves through the housing portion and cools the motor.

12. A semi-hermetic compressor comprising:
a compressor portion and a motor encased in a housing portion; the compressor portion configured to compress ammonia, and being driven by the motor; the motor comprising a plurality of individually insulated copper field wires; and a pass-through assembly for passing the individually insulated copper filed wires in electrical isolation from the motor through the semi-hermetic compressor housing portion to an external terminal.

13. The compressor of claim 12, wherein the pass-through assembly comprises a base portion, a first isolation portion, a second isolation portion, and a cap portion; wherein the base portion forms an airtight seal between the housing portion and an external periphery of the base portion; each of the first and second isolation portions comprising respective apertures for receiving and compressing wire insulation on the individually insulated copper field wires passing through the base portion.

14. The compressor of claim 13, further comprising an anti-rotation element disposed between the cap portion and the base portion to prevent relative rotation between the cap portion and the base portion.

15. The compressor of claim 13, further comprising a sealant disposed in a space between the first isolation portion and the second isolation portion.

16. The compressor of claim 12, wherein the ammonia passes through the semi-hermetic compressor housing portion to cool the motor.

17. The compressor of claim 12, wherein the compressor comprise a screw compressor.

18. A semi-hermetic compressor comprising;
a compressor portion and a motor encased in a housing portion; the compressor portion configured to compress a working fluid of ammonia, and being driven by the motor; the motor comprising a rotor and a stator, the stator having a plurality of field windings, the each of the plurality of field windings comprising copper wires; the copper wires having wire insulation that prevents expose of the copper wires to ammonia and/or water; the copper wires extending in an interior of the housing portion from the stator of the motor and to an exterior of the housing portion through a pass-through connector mounted in the housing portion; the pass-through connector having a conduit that seals air passages around the copper wires and compresses the wire insulation of the copper wires to prevent leakage of the ammonia to an external atmosphere.

19. The compressor of claim 18, wherein the pass-through connector comprises a pass-through assembly having at least one isolator, the at least one isolator having a plurality of apertures, each of the plurality of apertures of the at least one isolator receiving an individual copper wire with wire insulation and compressing the wire insulation of the copper wire.

20. The compressor of claim 19, wherein the at least one isolator comprises a first isolator portion and a second isolator portion, each of the first isolator portion and the second isolator portion having corresponding apertures that receive the individual copper wire with wire insulation, and wherein a sealant is located between the first isolator portion and the second isolator portion.

21. The compressor of claim 18, wherein the ammonia passes through the housing portion and cools the motor.

22. The compressor of claim 21, wherein the compressor comprises a screw compressor and the motor operates via a variable frequency drive.

23. A semi-hermetic compressor comprising:
a compressor portion and a motor encased in a housing portion; the compressor portion configured to compress a working fluid of ammonia, and being driven by the motor; the motor comprising a plurality of field windings; the plurality of field windings comprising insulated copper wires that form a stator of the motor and extend from the stator within an interior of the housing portion to an exterior of the housing portion through a pass-through assembly mounted in the housing portion; wherein the pass-through assembly compresses the insulated copper wires to form an ammonia tight seal around the insulated copper wires.

24. The compressor of claim 23, wherein the pass-through assembly comprises a compression-type fitting that seals air passages around an outside of the insulated copper wires and also compresses wire insulation around individual insulated copper wires to prevent ammonia leakage along a path of the individual insulated copper wires where the individual insulated copper wire passes through the pass-through assembly to an external atmosphere.

25. The compressor of claim 24, wherein the compression-type fitting comprises at least one isolator, the at least one isolator having a plurality of apertures, each of the plurality of apertures of the at least one isolator receiving an individual copper wire with wire insulation and compressing the wire insulation of the individual copper wire.

26. The compressor of claim 23, wherein the motor is exposed to ammonia moving through the housing portion which cools the motor.

27. The compressor of claim 23, wherein the compressor comprises a screw compressor and the motor operates via a variable frequency drive.

28. A semi-hermetic compressor comprising:
a compressor portion and a motor encased in a housing portion; the compressor portion being driven by the motor and compressing a working fluid of ammonia that moves through the housing portion to cool the motor; the motor comprising a plurality of field windings; the plurality of field windings comprising copper wires that extend from the motor to an exterior of the housing portion through a connector mounted in the housing portion; the connector having a conduit that forms a seal around the copper wires, the copper wires having an insulation system that protects the copper wires from exposure to any ammonia, water, and/or mixtures of water and ammonia in the housing portion.

29. The compressor of claim 28, wherein the insulation system that protects the copper wires from exposure to any ammonia, water, and/or mixtures of water and ammonia in the housing portion comprises wire insulation around individual copper wires.

30. The compressor of claim 29, wherein the insulated copper wires extend to an exterior atmosphere about the exterior of the housing portion for connection to an external power source.

31. The compressor of claim 30, wherein the pass-through assembly comprises a compression-type fitting.

32. The compressor of claim 31, wherein the compression-type fitting comprises at least one isolator, the at least one isolator having a plurality of apertures, each of the plurality of apertures of the at least one isolator receiving an individual copper wire with wire insulation and compressing the wire insulation of the individual copper wire.

33. A semi-hermetic compressor comprising:
a compressor portion and a motor encased in a housing portion; the compressor portion configured to compress a working fluid of ammonia, and being driven by the motor; insulated copper wires extending from a stator of the motor to an exterior of the housing portion, the insulated copper wires extending through at least one pass-through assembly mounted in the housing that compresses the insulated copper wires to form an ammonia tight seal around the insulated copper wires.

34. The compressor of claim 33, wherein the at least one pass-through assembly comprises a compression-type fitting.

35. The compressor of claim 34, wherein the compression-type fitting provides a sealed conduit for the insulated copper wires to extend to an exterior atmosphere about the exterior of the housing portion for connection to an external power source.

36. The compressor of claim 33, wherein the ammonia passes through the housing portion and cools the motor.

37. The compressor of claim 34, wherein the compression-type fitting comprises at least one isolator, the at least one isolator having a plurality of apertures, each of the plurality of apertures of the at least one isolator receiving an individual copper wire with wire insulation and compressing the wire insulation of the individual copper wire.

\* \* \* \* \*